(12) United States Patent
Gahalaut

(10) Patent No.: US 7,560,874 B2
(45) Date of Patent: Jul. 14, 2009

(54) ELECTRONIC BALLAST WITH IMPROVED INVERTER STARTUP CIRCUIT

(75) Inventor: Piyush Gahalaut, Haryana (IN)

(73) Assignee: Osram Sylvania Inc., Danvers, MA (US)

( * ) Notice: Subject to any disclaimer, the term of this patent is extended or adjusted under 35 U.S.C. 154(b) by 208 days.

(21) Appl. No.: 11/537,620

(22) Filed: Sep. 30, 2006

(65) Prior Publication Data
US 2008/0088251 A1    Apr. 17, 2008

(51) Int. Cl.
H05B 37/02 (2006.01)
(52) U.S. Cl. ............... 315/224; 315/209 R; 315/DIG. 7
(58) Field of Classification Search ............. 315/209 R, 315/224, 225, 307, 291, 244, 276; 363/16, 363/22
See application file for complete search history.

(56) References Cited

U.S. PATENT DOCUMENTS

| 4,745,537 | A | | 5/1988 | Cheung |
| 5,461,287 | A | * | 10/1995 | Russell et al. ............ 315/209 R |
| 5,747,941 | A | * | 5/1998 | Shackle et al. ............. 315/224 |
| 5,880,562 | A | * | 3/1999 | Nakagawa et al. .......... 315/224 |
| 6,246,173 | B1 | | 6/2001 | Fischer et al. |
| 7,030,566 | B2 | * | 4/2006 | Heckmann ............. 315/209 R |
| 7,042,161 | B1 | | 5/2006 | Konopka |
| 2005/0062439 | A1 | * | 3/2005 | Hui et al. ..................... 315/291 |
| 2005/0068795 | A1 | | 3/2005 | Konopka |

FOREIGN PATENT DOCUMENTS

| CA | 2 254 392 A1 | 5/1999 |
| CN | 1220572 | 6/1999 |
| CN | 1196380 C | 4/2005 |
| DE | 197 51 063 A1 | 5/1999 |
| EP | 0 917 412 A2 | 5/1999 |
| EP | 0 917 412 A3 | 7/1999 |
| EP | 0 917 412 B1 | 2/2003 |
| JP | 11-252933 A | 9/1999 |
| JP | 4216934 B2 | 1/2009 |
| KR | 10-0596950 B1 | 6/2006 |

OTHER PUBLICATIONS

International Search Report for International Application No. PCT/US2007/019628 dated Mar. 28, 2008 (1 page).

* cited by examiner

*Primary Examiner*—Douglas W Owens
*Assistant Examiner*—Ephrem Alemu
(74) *Attorney, Agent, or Firm*—Shaun P. Montana

(57) ABSTRACT

An electronic ballast (20) for powering at least one gas discharge lamp (30) comprises a self-oscillating half-bridge inverter (200') having an inverter startup circuit (286,288, 290) that does not require a voltage breakdown device, such as a diac. Inverter startup circuit (286,288,290) comprises a first resistor (286), a second resistor (288), and a capacitor (290).

10 Claims, 2 Drawing Sheets

ELECTRONIC BALLAST WITH IMPROVED INVERTER STARTUP CIRCUIT

FIELD OF THE INVENTION

The present invention relates to the general subject of circuits for powering gas discharge lamps. More particularly, the present invention relates to an electronic ballast having an improved inverter startup circuit.

BACKGROUND OF THE INVENTION

Many existing electronic ballasts for powering gas discharge lamps include a self-oscillating half-bridge type inverter. An essential part of a self-oscillating half-bridge inverter is an inverter startup circuit that initiates self-oscillating operation of the inverter.

FIG. 1 describes a common prior art ballast 10 that includes a front-end circuit 100, a self-oscillating half-bridge inverter 200, and a series resonant output circuit 300. Front-end circuit typically consists of a full-wave rectifier circuit followed by an appropriate circuit (e.g., a boost converter, a valley-fill circuit, etc.) for providing a substantially direct current (DC) voltage, $V_{RAIL}$, and (optionally) for providing power factor correction. Self-oscillating half-bridge inverter 200 receives the substantially DC voltage, $V_{RAIL}$, via inverter input terminals 202,204) and provides, via inverter output terminals 206,208, a high frequency output voltage to series resonant output circuit 300. Series resonant output circuit 300 provides a high voltage for igniting lamp 30 and a magnitude-limited current for operating lamp 30 at a desired current.

As illustrated in FIG. 1, self-oscillating half-bridge inverter 200 includes a diac-based inverter startup circuit 270,274, 276,280 for initially activating inverter transistor 240. The diac-based inverter startup circuit consists of a resistor 270, a capacitor 274, a diac 276, and a diode 280. The structure and operation of the diac-based starting circuit is well known to those skilled in the arts pertaining to power supplies and electronic ballasts.

Once inverter transistor 240 is initially turned on by inverter startup circuit 270,274,276,280, inverter transistors 220,240 are complementarily commutated (i.e., switched on and off such that, when transistor 220 is on, transistor 240 is off, an vice-versa) by drive signals provided by a base-drive transformer comprising a primary winding 340 and two secondary windings 342,344.

Inverter startup circuits that require voltage breakdown devices such as diacs are known to be plagued by problems relating to cost and reliability. Accordingly, a need exists for an improved inverter startup circuit that does not require a voltage breakdown device such as a diac. A further need exists for an improved inverter startup circuit that is less costly and more reliable than a diac-based inverter startup circuit. Accordingly, an electronic ballast with such an improved inverter startup circuit would represent a significant advance over the prior art.

DETAILED DESCRIPTION OF THE PREFERRED EMBODIMENTS

Figure 2:
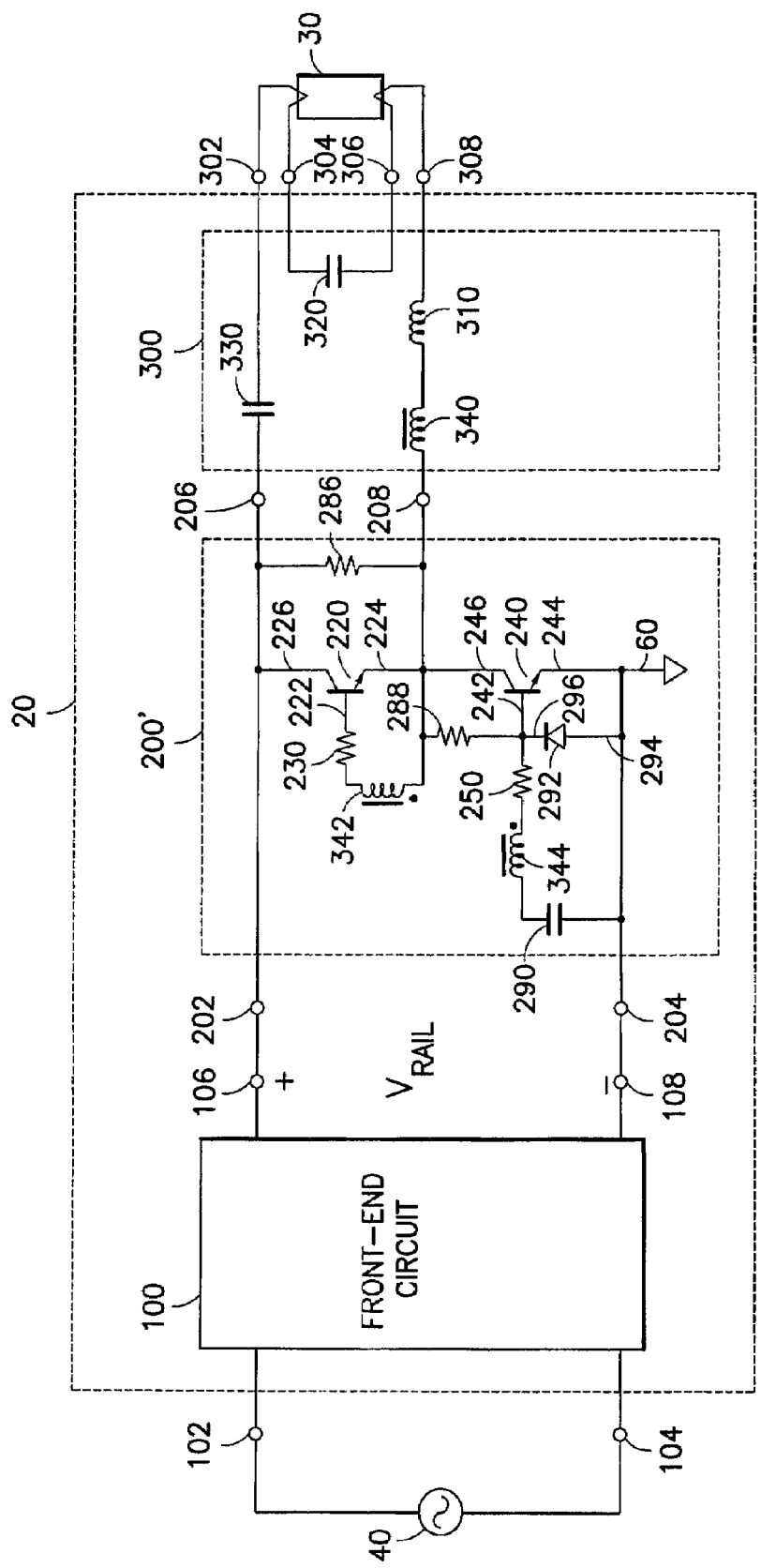
FIG. 2 is an electrical diagram of an electronic ballast with a self-oscillating half-bridge inverter that includes an improved inverter startup circuit, in accordance with a preferred embodiment of the present invention.

FIG. 2 describes a ballast 20 for powering a gas discharge lamp 30. Ballast 20 includes a half-bridge inverter 200' comprising first and second inverter input terminals 202,204, first and second inverter output terminals 206,208, a first inverter switch 220, a second inverter switch 240, a first base-drive circuit 230,342, a second base-drive circuit 250,344, and an inverter startup circuit 286,288,290. Inverter startup circuit 286,288,290 provides ballast 20 with significant operational and cost benefits in comparison with prior art ballast 10.

First and second inverter input terminals 202,204 are adapted to receive a source of substantially direct current (DC) voltage, $V_{RAIL}$, as provided by a front-end circuit 100. Front-end circuit typically includes a rectifier circuit in combination with some form of power factor correction circuitry (e.g., a boost converter, a valley-fill circuit, etc.). Inverter output terminals 206,208 are intended to be connected to an output circuit 300 via which ignition voltage and steady-state operating power is delivered to lamp 30. First inverter output terminal 206 is coupled to first inverter input terminal 202.

First and second inverter switches 220,240 are realized by suitable power switching devices, such as NPN type bipolar junction transistors (as depicted in FIG. 2). First inverter switch 220, which has a base terminal 222, an emitter terminal 224, and a collector terminal 226, is coupled between first inverter input terminal 202 and second inverter output terminal 208; more specifically, collector terminal 226 is coupled to first inverter output terminal 206, and emitter terminal 224 is coupled to second inverter output terminal 208. Second inverter switch 240, which has a base terminal 242, an emitter terminal 244, and a collector terminal 246, is coupled between second inverter output terminal 208 and circuit ground 60; more specifically, collector terminal 246 is coupled to second inverter output terminal 208, and emitter terminal 244 is coupled to circuit ground 60. Circuit ground 60 is coupled to second inverter input terminal 204.

First base-drive circuit 230,342 is coupled to first inverter switch 220, and includes a series combination of a first base-drive winding 342 and a first base-drive resistor 230; the series combination of first base-drive winding 342 and first base-drive resistor 230 is coupled between base terminal 222 of first inverter switch 220 and second inverter output terminal 208. Second base-drive circuit 250,344 is coupled to second inverter switch 240, and includes a series combination of a second base-drive winding 344 and a second base-drive resistor 250; the series combination of second base-drive winding 344 and second base-drive resistor 250 is coupled between base terminal 242 of second inverter switch 240 and circuit ground 60.

Figure 1:
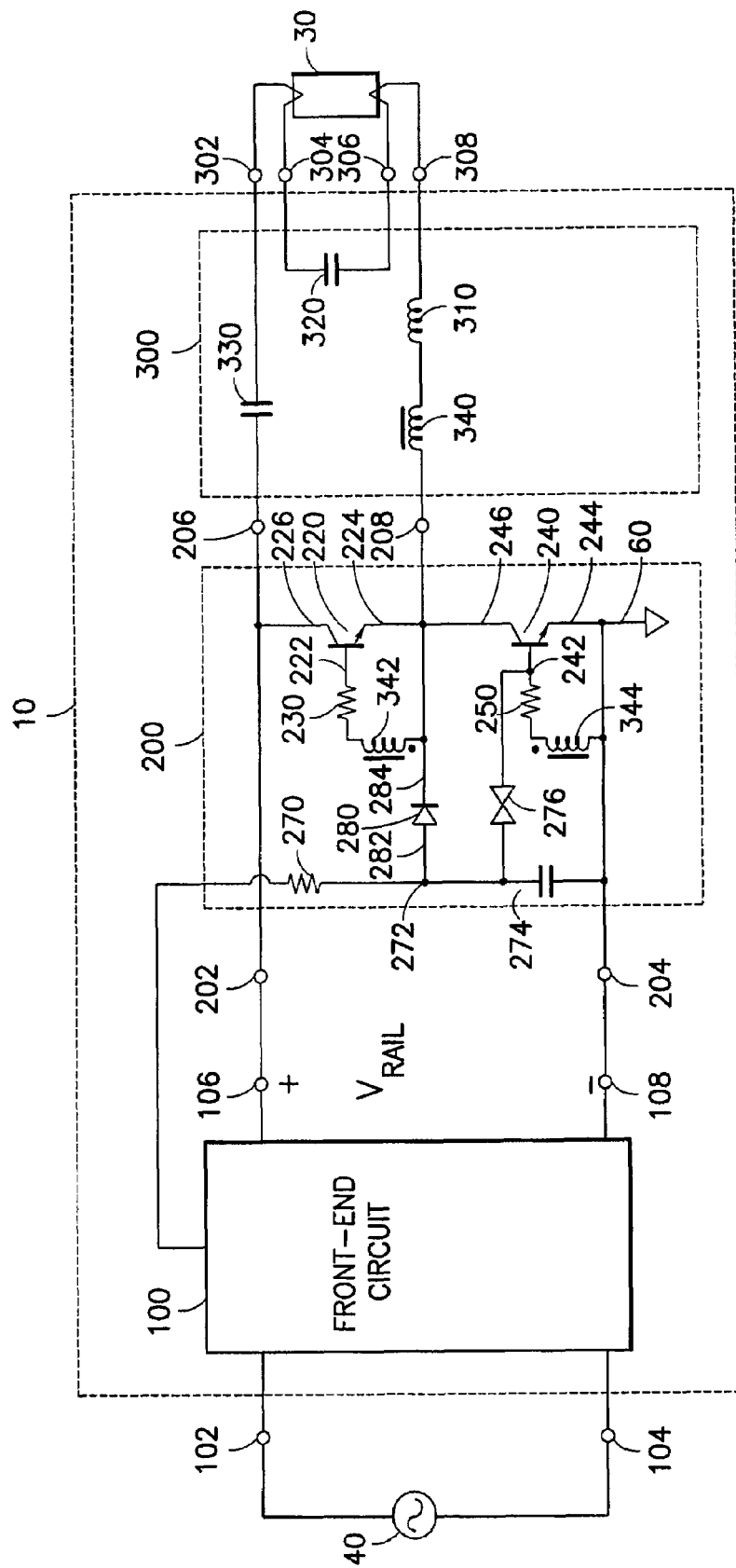
FIG. 1 is an electrical diagram of an electronic ballast with a self-oscillating half-bridge inverter that includes a diac-based inverter startup circuit, in accordance with the prior art.

Inverter startup circuit 286,288,290 is operably coupled to first inverter output terminal 206, second base-drive circuit 250,344, and base terminal 242 of second inverter switch 240. During operation, inverter startup circuit 286,288,290 provides a starting voltage for initially activating second inverter switch 240, thereby initiating self-oscillating operation of inverter 200'. Significantly, inverter startup circuit 286,288, 290 provides for startup of inverter 200' without requiring a voltage breakdown device, such as a diac. Consequently, inverter startup circuit 286,288,290 has significantly lower material cost, and provides ballast 20 with potentially higher reliability, than the prior art approach illustrated in FIG. 1.

As described in FIG. 2, inverter startup circuit 286, 288, 290 preferably comprises a first resistor 286, a second resistor 288, and a capacitor 290. First resistor 286 is coupled between first inverter output terminal 206 and second inverter output terminal 208. Second resistor 288 is couple between second inverter output terminal 208 and base terminal 242 of second inverter switch 240. Capacitor 290, which is preferably realized by an electrolytic capacitor having a capacitance on the order of about one (1) microfarad and a voltage rating of about 25 volts, is coupled between second base-drive winding 344 and circuit ground 60.

During operation of ballast 20, shortly after AC power is initially applied to input connections 102,104, the output voltage, $V_{RAIL}$, of front-end circuit 100 assumes a value (e.g., 390 volts) that is approximately equal to the peak magnitude of the voltage provided by AC voltage source 40 (e.g., 277 volts rms at 60 hertz, corresponding to a peak magnitude of about 390 volts). Within inverter startup circuit 286,288,290, a substantially DC current flows through the circuit path including resistors 286,288 and capacitor 290, thereby charging up capacitor 290. When the voltage across capacitor 290 reaches a sufficient level, second inverter transistor 240 turns on, thereby allowing inverter 200' to begin the process of self-oscillation. Subsequently, inverter transistors 220,240 are turned on and off by voltage signals provided by base-drive windings 342,344 which are magnetically coupled to a primary winding 340 within output circuit 300.

Referring again to FIG. 2, the inverter startup circuit preferably also includes a diode 292 having an anode 294 coupled to circuit ground 60 and a cathode 296 coupled to base terminal 242 of second inverter switch 240.

As illustrated in FIG. 2, ballast 20 preferably includes a front-end circuit 100 and a resonant output circuit 300.

Front-end circuit 100 includes a pair of input connections 102,104 and a pair of output connections 106,108. Input connections 102,104 are adapted to receive a source of alternating current (AC) voltage 40 (e.g., 277 volts at 60 hertz). Output connections 106,108 are coupled to first and second input terminals 202,204 of inverter 200'. During operation, front-end circuit 100 receives AC voltage source 40 and provides a substantially DC voltage, $V_{RAIL}$, between output connections 106,108.

Resonant output circuit 300 preferably includes first, second, third, and fourth output connections 302,304,306,308, a series combination of a resonant inductor 310 and a primary winding 340 of a base-drive transformer, a resonant capacitor 320, and a direct current (DC) blocking capacitor 330. Output connections 302,304,306,308 are intended to be coupled to gas discharge lamp 30. The series combination of resonant inductor 310 and primary winding 340 of the base-drive transformer (wherein primary winding 340 is magnetically coupled to first and second base-drive windings 342,344, which constitute secondary windings of the base-drive transformer) is coupled between second inverter output terminal 208 and fourth output connection 308. Resonant capacitor 320 is coupled between second and third output connections 304,306. DC blocking capacitor 320 is coupled between first inverter output terminal 206 and first output connection 302.

Although the present invention has been described with reference to certain preferred embodiments, numerous modifications and variations can be made by those skilled in the art without departing from the novel spirit and scope of this invention.

What is claimed is:

1. An electronic ballast for powering at least one gas discharge lamp, the ballast comprising:
   a half-bridge inverter, comprising:
      first and second inverter input terminals adapted to receive a source of substantially direct current (DC) voltage;
      first and second inverter output terminals, wherein the first inverter output terminal is coupled to the first inverter input terminal;
      a first inverter switch coupled between the first inverter input terminal and the second inverter output terminal, the first inverter switch having a base terminal;
      a second inverter switch coupled between the second inverter output terminal and circuit ground, the second inverter switch having a base terminal, wherein circuit ground is coupled to the second inverter input terminal;
      a first base-drive circuit comprising a series combination of a first base-drive winding and a first base-drive resistor, the series combination being coupled between the base terminal of the first inverter switch and the second inverter output terminal;
      a second base-drive circuit comprising a series combination of a second base-drive winding and a second base-drive resistor, the series combination being coupled between the base terminal of the second inverter switch and circuit ground; and
      an inverter startup circuit operably coupled to the first inverter output terminal, the second base-drive circuit, and the base terminal of the second inverter switch, and operable to provide a starting voltage for initially activating the second inverter switch, wherein the inverter startup circuit is characterized as being devoid of a voltage breakdown device, the inverter startup circuit comprising:
      a first resistor coupled between the first and second inverter output terminals;
      a second resistor coupled between the second inverter output terminal and the base terminal of the second inverter switch; and
      a capacitor coupled between the second base-drive circuit and circuit ground.

2. The electronic ballast of claim 1, wherein the capacitor has a capacitance on the order of about one microfarad.

3. The electronic ballast of claim 1, wherein the inverter startup circuit further comprises a diode having an anode coupled to circuit ground and a cathode coupled to the base terminal of the second inverter transistor.

4. The electronic ballast of claim 1, wherein each of the first and second inverter switches is a NPN-type bipolar junction transistor.

5. The electronic ballast of claim 1, further comprising a resonant output circuit, the resonant output circuit comprising:
   first, second, third, and fourth output connections adapted for coupling to the at least one gas discharge lamp;
   a series combination of a resonant inductor and a primary winding of a base-drive transformer, the series combination being coupled between the second inverter output terminal and the fourth output connection, wherein the primary winding of the base-drive transformer is magnetically coupled to the first and second base-drive windings of the inverter;
   a resonant capacitor coupled between the second and third output connections; and
   a direct current (DC) blocking capacitor coupled between the first inverter output terminal and the first output connection.

6. The electronic ballast of claim 1, further comprising a front-end circuit having a pair of input connections and a pair of output connections, wherein the input connections are adapted to receive a source of alternating current (AC) voltage and the output connections are coupled to the first and second input terminals of the inverter, the front-end circuit being operable to provide the source of substantially DC voltage between the output connections.

7. An electronic ballast for powering at least one gas discharge lamp, the ballast comprising:
   a half-bridge inverter, comprising:
      first and second inverter input terminals adapted to receive a source of substantially direct current (DC) voltage;
      first and second inverter output terminals, wherein the first inverter output terminal is coupled to the first inverter input terminal;
      a first inverter switch coupled between the first inverter input terminal and the second inverter output terminal, the first inverter switch having a base terminal;
      a second inverter switch coupled between the second inverter output terminal and circuit ground, the second inverter switch having a base terminal, wherein circuit ground is coupled to the second inverter input terminal;
      a first base-drive circuit comprising a series combination of a first base-drive winding and a first base-drive resistor, the series combination being coupled between the base terminal of the first inverter switch and the second inverter output terminal;
      a second base-drive circuit comprising a series combination of a second base-drive winding and a second base-drive resistor, the series combination being coupled between the base terminal of the second inverter switch and circuit ground;
      an inverter startup circuit, comprising:
         a first resistor coupled between the first and second inverter output terminals;
         a second resistor coupled between the second inverter output terminal and the base terminal of the second inverter switch;
         a capacitor coupled between the second base-drive circuit and circuit ground; and
         a diode having an anode coupled to circuit ground and a cathode coupled to the base terminal of the second inverter transistor;
      an output circuit comprising:
         first, second, third, and fourth output connections adapted for coupling to the at least one gas discharge lamp;
         a series combination of a resonant inductor and a primary winding of a base-drive transformer, the series combination being coupled between the second inverter output terminal and the fourth output connection, wherein the primary winding of the base-drive transformer is magnetically coupled to the first and second base-drive windings of the inverter;
         a resonant capacitor coupled between the second and third output connections; and
         a direct current (DC) blocking capacitor coupled between the first inverter output terminal and the first output connection.

8. The electronic ballast of claim 7, wherein the capacitor has a capacitance on the order of about one microfarad.

9. The electronic ballast of claim 7, wherein each of the first and second inverter switches is a NPN-type bipolar junction transistor.

10. The electronic ballast of claim 9, further comprising a front-end circuit having a pair of input connections and a pair of output connections, wherein the input connections are adapted to receive a source of alternating current (AC) voltage and the output connections are coupled to the first and second input terminals of the inverter, the front-end circuit being operable to provide the source of substantially DC voltage between the output connections.

* * * * *